United States Patent
Fan et al.

(10) Patent No.: US 10,093,874 B2
(45) Date of Patent: Oct. 9, 2018

(54) COAL GASIFICATION WITH FECO$_3$ CATALYST

(71) Applicant: University of Wyoming, Laramie, WY (US)

(72) Inventors: Maohong Fan, Ames, IA (US); Rodolfo Monterrozo, Guatemala (GT)

(73) Assignee: UNIVERSITY OF WYOMING, Laramie, WY (US)

( * ) Notice: Subject to any disclaimer, the term of this patent is extended or adjusted under 35 U.S.C. 154(b) by 328 days.

(21) Appl. No.: 14/663,205

(22) Filed: Mar. 19, 2015

(65) Prior Publication Data

US 2015/0267132 A1 Sep. 24, 2015

Related U.S. Application Data

(60) Provisional application No. 61/955,608, filed on Mar. 19, 2014.

(51) Int. Cl.
*C10J 3/06* (2006.01)
*C10J 3/46* (2006.01)
*C10J 3/02* (2006.01)

(52) U.S. Cl.
CPC ......... *C10J 3/02* (2013.01); *C10J 2300/0903* (2013.01); *C10J 2300/093* (2013.01); *C10J 2300/0973* (2013.01); *C10J 2300/0976* (2013.01); *C10J 2300/0986* (2013.01); *C10J 2300/1246* (2013.01); *C10J 2300/1853* (2013.01); *Y02E 20/18* (2013.01); *Y02P 20/52* (2015.11)

(58) Field of Classification Search
CPC .............. C10J 3/02; C10J 2300/0903; C10J 2300/093; C10J 2300/0976; C10J 2300/0986; C10J 2300/1853; C10J 2300/0973; C10J 2300/1246; Y02E 20/18; Y02P 20/52
See application file for complete search history.

(56) References Cited

U.S. PATENT DOCUMENTS 3,847,567 A * 11/1974 Kalina ............... C07C 1/00
48/127.7
4,284,416 A * 8/1981 Nahas ............... C10J 3/00
252/373

(Continued)

OTHER PUBLICATIONS

Monterrozo, Rodolfo, Effects and characterization of an environmentally-friendly, inexpensive composite iron-sodium catalyst on coal gasification, Ph.D., Department of Chemical & Petroleum Engineering, Dec. 2013.*

(Continued)

*Primary Examiner* — Amber R Orlando
*Assistant Examiner* — Syed T Iqbal
(74) *Attorney, Agent, or Firm* — Patterson + Sheridan, LLP

(57) ABSTRACT

Embodiments described herein generally relate to iron carbonate utilized as a catalyst in coal gasification processes. An FeCO$_3$ catalyst is active in both pyrolysis and gasification operations, and may increase carbon conversion rate and reduce the activation energy of coal gasification. Methods described herein also include suitable processing conditions for performing coal gasification with the FeCO$_3$ catalyst.

20 Claims, 10 Drawing Sheets
(8 of 10 Drawing Sheet(s) Filed in Color)

(56) References Cited

U.S. PATENT DOCUMENTS

| | | | | |
|---|---|---|---|---|
| H1538 H | * | 6/1996 | Harryman | C10J 3/00 252/373 |
| 8,546,636 B1 | * | 10/2013 | Potgieter | C10B 3/00 252/373 |
| 2013/0032761 A1 | | 2/2013 | Fan et al. | |

OTHER PUBLICATIONS

Roberts et al. "On the Effects of High Pressure and Heating Rate during Coal Pyrolysis on Char Gasification Reactivity" Energy & Fuels, vol. 17, No. 4, 200 (Year: 2003).*

Yasuo Ohtsuka, et al., Iron-Catalyzed Gasification of Brown Coal at Low Temperatures, Energy & Fuels 1987 American Chemical Society, vol. 1, No. 1, pp. 32-36.

Byung Ho Song, et al., Catalytic Activity of Alkali and Iron Salt Mixtures for Steam-Char Gasification, Fuel 72 (1993), No. 6, 7 pp.

Jianglong Yu, et al., Effect of Iron on the Gasification of Victorian Brown Coal with Steam:Enhancement of Hydrogen Production, Fuel 85 (2006), pp. 127-133.

G. Domazetis, et al., Studies of Inorganics Added to Low-rank Coals for Catalytic Gasification, Fuel Processing Technology, 86 (2005) pp. 463-486.

Tiberiu Popa, et al., Catalytic Gasification of a Powder River Basin Coal, Fuel 103 (2013) pp. 161-170.

Peter J. J. Tromp, et al., Probing the Influence of K2CO3- and NA2CO3—Addition on the Flash Pyrolysis of a Lignite and a Bituminous Coal with Curie-point Pyrolysis Techniques, Fuel 65 (Jul. 1986), 8 pp.

Dong Zeng, et al., On the Rank-dependence of Coal Tar Secondary Reactions, Proceedings of the Combustion Institute 33 (2011), pp. 1707-1714.

Rene Cypres, et al., Pyrolysis of Coal and Iron Oxides Mixtures. 1 Influence of Iron Oxides on the Pyrolysis of Coal , Fuel 59 (Jan. 1980), 7 pp.

Chunbao (Charles) Xu, et al., Recent Advances in Catalysts for Hot-gas Removal of Tar and NH3 from Biomass Gasification, Fuel 89 (2010), pp. 1784-1795.

Pekka A. Simell, et al., Catalytic Purification of Tarry Fuel Gas with Carbonate Rocks and Ferrous Materials, Fuel 71 (1992), 8 pp.

Thomas Nordgreen, et al., Metallic Iron as a Tar Breakdown Catalyst Related to Atmospheric, Fluidised Bed Gasification of Biomass, Fuel 85 (2006), pp. 689-694.

Koichi Matsuoka, et al., Steam Reforming of Woody Biomass in a Fluidized Bed of Iron Oxide-Impregnated Porous Alumina, Energy & Fuels 20, (2006), pp. 2727-2731.

Gunter Hermann et al., Mechanism of Iron-Catalyzed Water Vapou Gasification of Carbon, Carbon 24 (1986) No. 4, pp. 429-435.

Xu Shenqi, et al., Effects of Alkaline Metal on Coal Gasification at Pyrolysis and Gasification Phases, Fuel 90 (2011), pp. 1723-1730.

E. De Grave, et al., Evaluation of Ferrous and Ferric Mossbauer Fractions, Phys. Chem. Minerals 18 (1991), pp. 337-342.

Sunzo Yui, et al., Decomposition of Siderite to Magnetite at Lower Oxygen Fugacities: A Thermochemical Interpretation and Geological Implications, 61 (1966) pp. 768-776.

Yurii D. Perfiliev, et al., Higher Oxidation States of Iron in Solid State: Synthesis and Their Mossbauer Characterization, American Chemical Society 2008, 6 pp.

K. Asami, et al., Gasification of Brown Coal and Char with Carbon Dioxide in the Presence of Finely Dispersed Iron Catalysts, Fuel Processing Technology 47 (1996) pp. 139-151.

J. Alcaniz-Monge, et al., Characterisation of Coal Tar Pitches by Thermal Analysis, Infrared Spectroscopy and Solvent Fractionation, Fuel 80 (2001) pp. 41-48.

Tiberiu Popa, et al., High Temperature Water Gas Shift Catalysts with Alumina, Applied Catalysis A: General 379 (2010) pp. 15-23.

Yasuo Ohtsuka, et al., Chemical Form of Iron Catalysts during the CO2-Gasification of Carbon, Fuel 65 (Oct. 1986), 3 pp.

V. K. Diez, et al. Effect of the Chemical Composition on the Catalytic Performance of MgyAlOx Catalysts for Alcohol Elimination Reactions, 215 Journal of Catalysis (2003), 14 pp.

W. Suprun, et al., Gas-Phase Conversion of Glycerol over Mixed Metal Oxide Catalysts, Catalysis in Industry 3 (2011), No. 1, pp. 70-75.

G. A. Jensen, The Kinetics of Gasification of Carbon Contained in Coal Minerals at Atmospheric Pressure, Ind. Eng. Chem., Process Des. Dev., vol. 14, No. 3, 1975, 7 pp.

P. Vallet, The Fe—O (Iron-Oxygen) Phase Diagram in the Range of the Nonstoichiometric Monoxide and Magnetite at the Fe-Rich Limit: Reduction Diagrams, Bulletin of Alloy Phase Diagrams, 10 (1989) No. 3, 10 pp.

B. Prakash, Metallurgy of Iron and Steel Making and Blacksmithy in Ancient India, Indian Journal of History of Science 26 (1991)4, 21 pp.

L. Di Felice, et al., Biomass Gasification with Catalytic Tar Reforming: A Model Study into Activity Enhancement of Calcium- and Magnesium-Oxide-Based Catalytic Materials; by Incorporation of Iron, Energy Fuels (2010) 24, pp. 4034-4045.

* cited by examiner

COAL GASIFICATION WITH FECO$_3$ CATALYST

CROSS-REFERENCE TO RELATED APPLICATIONS

This application claims benefit of U.S. provisional patent application Ser. No. 61/955,608, filed Mar. 19, 2014, the entirety of which is incorporated herein by reference.

BACKGROUND

Field

Embodiments described herein generally relate to catalytic gasification of coal. More specifically, embodiments described herein relate to coal gasification with an FeCO$_3$ catalyst.

Description of the Related Art

Integrated gasification combined cycle (IGCC) of coal offers the advantages of higher efficiency and capability of CO$_2$ and pollutant separation compared to conventional coal-fired power plants. One important step in IGCC is coal gasification, which occurs within an energy-intensive high temperature environment. Therefore, the power generation industry and other natural resource industries are increasingly interested in using catalysts to improve coal gasification. Various catalysts for use in coal gasification have been investigated, but many are often cost prohibitive on an industrial scale. Iron compounds are potential gasification catalysts due to their abundance, low cost, and environmentally friendliness. Iron compounds have been previously investigated to catalyze coal gasification and their effects on coal pyrolysis and char gasification as well as tar formation during the whole coal gasification process.

Ohtsuka et al. used X-ray diffraction (XRD) to investigate the effect of three iron compounds on coal pyrolysis. When using FeCl3 as the iron precursor, Ohtsuka et al. reported the presence of both metallic a-Fe and FeO (wustite) when devolatilization was conducted in an inert atmosphere, and existence of Fe3O4 (magnetite) when devolatilization was performed within a steam environment. The effect of Fe2(SO4)3 was also studied and similar results were obtained, except for the appearance of FeS peaks within both inert and steam devolatilization environments. When Fe(NO3)3 was employed as the iron precursor in an inert atmosphere, a-Fe (crystal size <30 nm) and Fe3C were detected, while a combination of small crystallites (<10 nm) of Fe3O4 with FeO were found when steam was used for devolatilization. In addition, Ohtsuka et al. found that Fe(NO3)3, transformed into fine particles of mixed iron oxides during devolatilization, was effective for steam gasification while chloride and the sulfate, converted to magnetite with a large crystallite size, were not effective.

Alternatively, Song and Kim reported that Fe(NO3)3 was less active than FeSO4 during pyrolysis of a sub-bituminous coal with the same iron loading (3 wt %) at 700-800° C. Yu et al. loaded iron onto a brown coal using FeCl3 solution and obtained metallic α and γ Fe in the pyrolysis step and magnetite during gasification. Domazetis et al. reported that the char formed during pyrolysis of brown coal with added iron contained iron oxides and carbonates, as measured by X-ray photoelectron spectroscopy (XPS).

Coal tar is one of the byproducts formed during coal gasification. Tromp et al., using gas-chromatography (GC) and gas-chromatography-mass spectrometry (GC-MS), identified that the volatile compounds from a pyrolysis process included varying amounts of polycyclic hydrocarbons. Zeng et al. studied the tar and the soot generated by tar's secondary reactions, using Fourier transform infrared (FTIR) spectroscopy and nuclear magnetic resonance (NMR) spectroscopy of the dissolved samples in tetrahydrofuran (THF), also found that the tar molecules were typically poly-aromatic hydrocarbons (PAH) substituted with functional groups or heteroatoms, such as alkyl chains, oxygen, nitrogen, etc. Iron containing materials have also been tested for their effects on tar formation during coal gasification. Cypres and Soudan-Moinet found that iron oxides (Fe2O3 or Fe3O4) reduced both the primary devolatilization rate of coal (between 300° C. and 600° C.) and the tar and gaseous hydrocarbon yields, while the composition of the investigated tar did not change. Cypres and Soudan-Moinet also found that hematite iron had a greater influence than magnetite iron. Moreover, limonite (FeO(OH).nH2O) of various origins, iron oxides (FeO, Fe2O4, Fe3O4, and Fe2O3), ankerite (CaFe(CO3)2), sintered iron ore, and pelletized iron ore were evaluated by Nordgreen et al. and concluded that metallic iron from pre-reduced hematite (Fe2O3) was an effective catalyst and achieved almost 100% tar decomposition at 900° C.

Different mechanisms have been proposed to explain the effect of iron catalysts on the gasification of carbonaceous materials, including coal. Matsuoka et al. studied steam reforming of woody biomass in a fluidized bed at 500-700° C. with an Fe/γ-alumina catalyst and suggested that redox reactions take place on the iron oxide surface. Yu et al., Hermann and Huttinger, and Xu et al. indicated that the overall reactions with non-catalyzed steam carbon gasification occur on carbon particles and they are relatively simple, while those with iron-based steam gasification mainly proceed on the surface of iron species and much more complicated.

As described above, iron-based catalysts may be advantageous in coal gasification processes. However, certain iron salts may be cost prohibitive on an industrial scale. In addition, SO$_4^{2-}$, NO$_3^-$, and Cl$^-$ moieties may damage gasification equipment and also harm the environment. Moreover, H$_2$, CO, and CO$_2$ yields may be less than desirable depending on the catalyst utilized.

Thus, what is needed in the art are improved coal gasification catalysts and methods of utilizing catalysts in coal gasification processes to improve conversion and minimize deleterious effects of by-products.

SUMMARY

In one embodiment, a coal gasification method is provided. The method includes mixing a coal derived solid with an iron carbonate catalyst to form a reaction mixture, heating the reaction mixture to a target temperature between about 700° C. and about 900° C., contacting the reaction mixture with water vapor, and forming a syngas mixture from the reaction mixture.

In another embodiment, a coal gasification method is provided. The method includes mixing a coal derived powder with a calcined iron carbonate catalyst to form a reaction mixture and heating the reaction mixture to a target temperature between about 700° C. and about 900° C. The reaction mixture may be contacted with steam and the reaction mixture and the steam may be flowed into a gasifier. Nitrogen may be flowed into the gasifier, a pressure of the gasifier may be maintained at a pressure below about 1 atm, and a syngas mixture may be formed from the reaction mixture.

In yet another embodiment, a method of forming syngas from coal is provided. The method includes mixing a powdered coal having a moisture content of at least about 10 wt % with about 3 wt % of a $FeCO_3$ catalyst to form a reaction mixture and blending a stoichiometric excess of water vapor with the reaction mixture. The reaction mixture may be disposed in a gasifier and nitrogen may be added to the gasifier. A temperature of the reaction mixture may be maintained between about 700° C. and about 900° C. until a syngas mixture is formed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
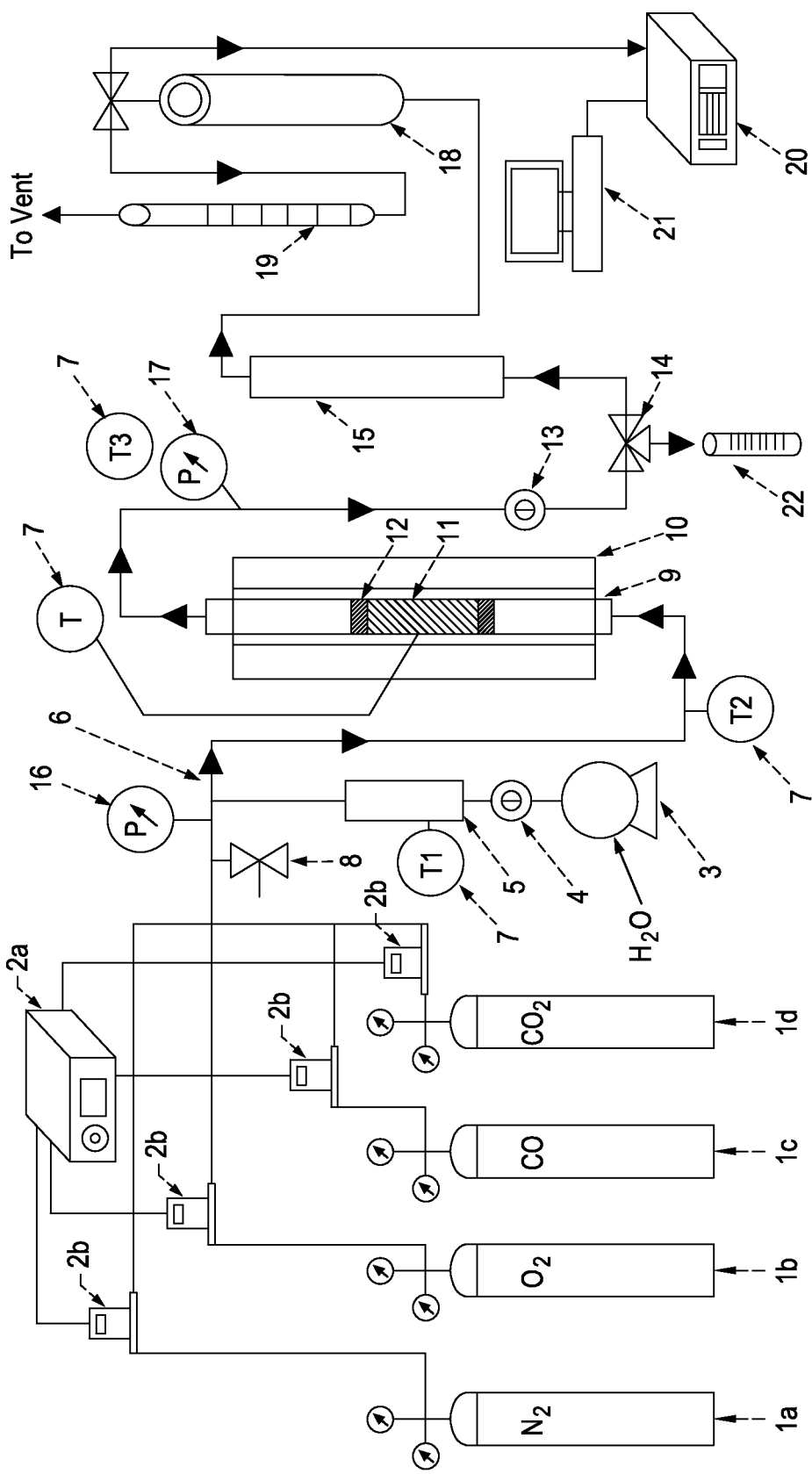
FIG. 1 illustrates a schematic diagram of coal gasification apparatus according to one embodiment described herein.

Embodiments described herein generally relate to iron carbonate utilized as a catalyst in coal gasification processes. Methods described herein also include suitable processing conditions for performing coal gasification with the $FeCO_3$ catalyst.

$FeCO_3$ may be utilized to catalyze coal gasification reactions and improve the yield of syngas, which includes $H_2$, CO, and $CO_2$, among other gases and byproducts. By lowering the activation energy required to perform coal gasification, $FeCO_3$ improves the efficiency of coal gasification and also reduces the amount of coal tar generated during coal gasification by increasing the volatility of coal tar. $FeCO_3$ is relatively inexpensive, making $FeCO_3$ a suitable catalyst for industrial scale applications. While the examples provided herein are described with regard to results obtained in a laboratory setting, it is contemplated that the processes and methods below may be scaled up for commercial and industrial applications.

EXPERIMENTAL SECTION

Material Preparation

Catalytic gasification of a Wyodak low-sulfur sub-bituminous coal from the Powder River Basin of Wyoming was investigated using an inexpensive iron carbonate catalyst applied via incipient wetness impregnation. Experiments in an atmospheric pressure fixed-bed laboratory gasifier were performed to evaluate the effects of reaction temperature, feed gas steam content, and $FeCO_3$ loading on the catalytic gasification of the Wyodak coal. The $FeCO_3$ catalyst is active in both pyrolysis and gasification operations, and may increase carbon conversion rate and reduce the activation energy of coal gasification.

The $FeCO_3$ catalyst was prepared in a $FeSO_4 \cdot 7H_2O$ solution by adding 50 g $FeSO_4 \cdot 7H_2O$ (99%, Alfa Products) to 125 ml distilled water, followed by titrating the solution with excess 10 wt % $Na_2CO_3$ solution made with $Na_2CO_3$ (99.8 wt %, FMC Inc.), which resulted in a light green precipitate of $FeCO_3$. The precipitate was filtered and washed with the sodium carbonate solution to remove $SO_4^{2-}$, washed again with distilled water, dried at 92° C., and calcined in air at 250° C. The $FeCO_3$ material was sieved and the particles smaller than 125 μm were retained and stored in an air-tight dark colored glass jar to prevent changes in the moisture content and structure of the prepared calcined $FeCO_3$.

Predetermined quantities of the iron catalyst were dry mixed with raw Wyodak coal from the Wyoming Powder River Basin (PRB). Then, distilled water was mixed with the resulting material using incipient wetness impregnation method to produce the Fe-coal mixtures. 80 wt % of the coal particles used were smaller than 74 μm. The nominal loadings of iron on the coal were calculated on a dry and ash free (DAF) coal basis. A reference sample was prepared using only distilled water. The resulting Fe-coal mixtures were air-dried at 98° C. (371 K) to constant mass and then stored in an air-tight receptacle to prevent further changes in moisture content or loss of volatile matter.

Characterization

Thermo-gravimetric analysis (TGA) tests were performed using a TA Instruments SDT Q600 apparatus. The first TGA operation loaded an approximately 50 mg coal sample into a ceramic capped alumina sample holder, which was followed by 10 minutes of isothermal equilibration, heating at 20° C./min within a 100 ml/min flowing Ar or $N_2$ (Ultra High Purity (UHP), US Welding) environment to a maximum pyrolysis temperature of 1200° C. The sample was held at the temperature for another 10 minutes for isothermal equilibration. The weight percentage of the char generated at a given temperature was calculated using the weight of the residual material (char) in the sample pan of the TGA apparatus at the particular temperature relative to the initial weight of coal sample.

The proximate analyses of the raw coal were performed according to ASTM D5142 and D5016. The ultimate analyses for raw coal and chars produced at 700° C., 800° C., and 900° C. were accomplished using ASTM methods D5373, D5016, and D4239. The chemical composition of the coal ash was measured using ASTM D6349.

X-ray diffraction (XRD) analyses were performed on powdered coal samples in a Philips X'pert PW3040-MPD. Analyses were conducted using Cu Kα radiation with 2Θ ranging from 15° to 85° with 0.010° steps and a time/step of 0.05 seconds. 0.05-0.10 g of finely powdered samples were collected before pyrolysis, during pyrolysis at 420° C., after pyrolysis, and 10 min or 20 min after gasification with steam started.

Fourier transform infrared spectroscopy (FTIR)/Raman analyses were performed on a Nicolet Magna 760 FTIR spectrometer (Thermo Scientific). The instrument has a 1064 nm Nd:$YVO_4$ excitation laser, an XT-KBr beam splitter, a He—Ne laser for sample alignment, a InGaAs detector, and a computer for automated spectra collection and analysis.

Mössbauer spectra were acquired at 295 K, 80 K, and 4 K using a source of approximately 30 mCi$^{57}$Co in Rh on a WEB Research Co. model WT302 spectrometer equipped with a Janus closed cycle He cooling system. For Mössbauer analysis, coal samples were mixed with sucrose under acetone and placed in a holder backed by KAPTON® polyimide film tape. The pure coal sample was run without sucrose; others analysis used approximately 40 mg of sample and approximately 260 mg of sucrose to dilute the sample and improve spectral acquisition. Data were collected over a ±10 mm/s velocity range in 2048 channels with acquisition times ranging from 12 hours to 6 days, depending on the Fe content of the samples. Spectra were corrected for nonlinearity via interpolation to a linear velocity scale, which is defined by the spectrum of the 25 μm Fe foil used for calibration. All data were corrected to remove the fraction of the baseline due to the Compton scattering of 122 keV gamma rays by electrons inside the detector. All spectra were fit using Mexdisd.

Gasification

FIG. 1 illustrates a gasification apparatus utilized to perform the processes described herein. FIG. 1 shows a schematic diagram of catalytic coal gasification with the following reference numerals: (1a) $N_2$, (1b) $O_2$, (1c) CO, (1d) $CO_2$; (2) mass flow controller; (3) high pressure pump; (4) back pressure regulator; (5) boiler; (6) heat traced stainless steel tubing; (7) thermocouples; (8) pressure relief valve; (9) stainless steel reactor; (10) furnace; (11) coal; (12) ceramic wool stopper; (13) back pressure regulator; (14) three way valve; (15) water-cooled condenser; (16) and (17) pressure gauges; (18) water trap; (19) flow meter (GC); (20) gas chromatograph (GC); (21) data acquisition system; and (22) water condensing and tar collection. The gasifier body is a stainless steel tube in a tube furnace. All tests were conducted at a pressure slightly above the ambient atmospheric pressure in laboratory. Note that due to the elevation of the laboratory (2,200 m), the ambient atmospheric pressure is about 75 kPa. Thus, the catalyzed coal gasification process may be performed at about 1 atm or less than about 1 atm. Catalyst-loaded coal samples were gasified in $H_2O$—$N_2$ mixtures.

A quantity of coal sample corresponding to approximately five grams of dry and ash free (DAF) coal was used for each gasification test. An iron carbonate catalyst was added to the coal to form a reaction mixture. The examples described herein provide for a reaction mixture comprising about 3 wt % iron carbonate catalyst. In certain embodiments, the iron carbonate catalyst may be provided in the reaction mixture between about 1 wt % and about 5 wt %. The reaction mixture was heated in $N_2$ at 20° C./minute to the desired gasification temperature and then water vapor was introduced. In one embodiment, the water vapor was introduced at a rate of about 0.04 g/min. In one embodiment, the water vapor is introduced in stoichiometric excess of the reaction mixture. The coal gasification kinetic experiments used the following inlet gases (1): $N_2$ (UHP, US Welding), $O_2$ (UHP, Air Liquide), CO (UHP, US Welding), and $CO_2$ (UHP, Praxair). The aforementioned gases may be omitted in a process for gasifying coal according to the methods described herein.

The flow rate of each gas into the process was controlled via the mass flow controller 2 (Porter Instruments series 201) with a 4 channel PCIM4 controller. Water was supplied by the high pressure pump 3 (Scientific Systems-Lab Alliance Series 1) with the back pressure regulator 4 (GO Regulator) and vaporized in a coil type vaporizer 5 wrapped with heating tape, although any source of steam or water vapor may be used.

The stainless steel tubing before and after the reactor was heat traced 6, with the temperatures of the tubing monitored by thermocouples 7 as indicated, to preheat the gas/water vapor mixture and to prevent coal tar and water condensation in the reactor outlet. Alternately, the tubing, or piping, before and after the reactor may be insulated.

The reactor assembly consisted of a ½ inch (13 mm) diameter tubular stainless steel reactor 9, with ceramic wool 12 supporting the coal sample. Outside the reactor, ceramic wool was also used for additional insulation, although any suitable material known in the art may be used for insulation and/or support.

The reactor was temperature controlled in the tube furnace 10 (Thermolyne 21100), although any suitable heat source may be used, including piping inside the reactor that contains a hot material such as hot oil or steam. In another alternate embodiment, an inert gas may be heated outside the reactor and flowed into the reactor to deliver heat.

The water cooled condenser 15 was utilized to separated the tar and water in the product gas from syngas produced as a result of the coal gasification process. The tar and water were also collected for analysis. The system pressure was regulated by the back pressure regulator 13 (GO Regulator) and monitored using pressure gauges 16, 17. The reactor was protected against over-pressure using a pressure relief valve 8. The flow rate of the remaining product gases was measured before venting to the fume hood. Alternately, the product gases may be collected, stored, subsequently processed or purified, and/or shipped via container or pipeline. For experimental purposes, a slipstream was diverted through a desiccant-filled water trap 18 to the gas chromatograph 20 (Agilent 3000A micro GC) equipped with two micro-columns (18 m MolSieve 5A PLOT and 4 m PoraPlot U) to separate $H_2$, CO, $N_2$, $CO_2$, and light hydrocarbons, such as $CH_4$, prior to concentration analysis using a calibrated thermal conductivity detector (TCD). All data were recorded on the data acquisition system 21.

Residence time of the catalyzed coal at reaction conditions may be up to 5,000 minutes and is usually at least about 100 minutes, such as between about 100 minutes and about 3,000 minutes, for example between about 100 minutes and about 2,000 minutes. At higher temperatures, lower residence times may be used. For example in one embodiment, a residence time between about 50 minutes and about 100 minutes, for example about 80 minutes may be used.

Coal Tar and Char Sampling

The tar samples were collected with the ware from the reactor outlet stream by cooling the volatile matter produced during pyrolysis and gasification in the water/tar condenser 15. The collections of tar and char were performed for both raw coal and Fe-coal samples at 700° C., 800° C., and 900° C. under pyrolysis conditions with a heating rate of 20° C./minute. Pyrolysis was followed by steam gasification with an $H_2O$ of about 0.04 g/min for 10 and 20 minutes. After the chars were cooled in flowing $N_2$, the samples were extracted and stored in $N_2$, while the tar samples were collected and stored in vials under $N_2$ to prevent property changes.

Results and Discussion

Characteristics of Raw Coal

Proximate and ultimate analyses and heating value for the selected Wyodak coal are shown in Table 1.

TABLE 1

| | As received (wt %) | Moisture free (wt %) | DAF (wt %) |
|---|---|---|---|
| Proximate analysis | | | |
| Moisture | 20.87 | — | — |
| Ash | 5.86 | 7.41 | — |
| Volatile matter | 34.29 | 43.33 | 46.80 |
| Fixed carbon | 38.98 | 49.26 | 53.20 |
| Total | 100.00 | 100.00 | 100.00 |
| Ultimate analysis | | | |
| Moisture | 20.87 | — | — |
| Hydrogen | 2.46 | 3.11 | 3.36 |
| Carbon | 53.67 | 67.83 | 73.26 |
| Nitrogen | 0.89 | 1.12 | 1.21 |
| Sulfur | 0.42 | 0.53 | 0.57 |

TABLE 1-continued

| | As received (wt %) | Moisture free (wt %) | DAF (wt %) |
|---|---|---|---|
| Oxygen | 15.83 | 20.00 | 21.60 |
| Ash | 5.86 | 7.41 | — |
| Total | 100.00 | 100.00 | 100.00 |
| Heating value (Btu/lb) | 9255 | 11,696 | 12,632 |
| (kJ/kg) | 21,527 | 27,205 | 29,382 |

Hydrogen and oxygen values reported in Table 1 do not include hydrogen and oxygen in the free moisture associated with the sample. The moisture content of the coal, as received, is nearly 21 wt %, which limits the measured heating value to 21,527 kJ/kg (9,255 BTU/lb) compared to 27,205 kJ/kg (11,696 BTU/lb) for the dry coal. The volatile matter fraction accounts for approximately 34 wt %. This portion generates flammable gases during pyrolysis and gives a more reactive character for the coal in entrained flow and fluidized bed gasification reactors. For other, lower-temperature gasification approaches, this volatile matter content would require a coal tar treatment unit operation. This is evident in the small-scale fixed-bed reactor facility used in this study, which included a dedicated coal tar separator. The ultimate analysis of this sub-bituminous coal shows the expected low sulfur content of 0.42 wt %. The relatively high oxygen content, calculated by difference at approximately 16 wt %, is advantageous for increasing this coal's reactivity during pyrolysis and for generating active sites during gasification.

The analysis results of raw coal ash are provided in Table 2.

TABLE 2

| Element | (wt %) | Oxide | (wt %) |
|---|---|---|---|
| Si | 14.24 | $SiO_2$ | 31.77 |
| Al | 7.59 | $Al_2O_3$ | 14.97 |
| Fe | 4.23 | $Fe_2O_3$ | 6.31 |
| Mg | 3.83 | MgO | 6.62 |
| Ca | 18.73 | CaO | 27.33 |
| Ti | 0.6 | $TiO_2$ | 1.04 |
| K | 0.66 | $K_2O$ | 0.83 |
| P | 0.51 | $P_2O_5$ | 1.22 |
| Na | 1.26 | $Na_2O$ | 1.77 |
| Mn | 0.02 | $MnO_2$ | 0.04 |
| Ba | 0.35 | BaO | 0.41 |
| Sr | 0.41 | SrO | 0.51 |
| S | 2.76 | $SO_3$ | 7.19 |

It should be noted that most of the cations in Table 2 are inherent components of the accompanying minerals in coal, which, during gasification, will combine with the atoms adjacent to them in the minerals to form compounds. Therefore, the cations are not believed to play a role in the catalytic cycle, rather, the cations form coal ash and slag Gasification tests were started with a temperature ramping rate of about 20° C./minute. However, it is contemplated that the ramping rate may be between about 1° C./minute and about 50° C./minute, depending on the size of the reactor and the amount of coal to be gasified. Table 3 provides analysis of the coal char produced at different temperatures showing the elimination of H, O, S, and N from the structure of the material and the corresponding increase in the concentration of C and ash in the resulting coal chars. It is believed that material balances of the gases produced during pyrolysis are eliminated predominantly as $H_2$, $H_2O$, CO, $CO_2$, $N_2$, various sulfur compounds, and coal tar.

TABLE 3

| wt % | T (° C.) | | |
|---|---|---|---|
| | 700 | 800 | 900 |
| Ash | 22.82 | 27.13 | 30.62 |
| C | 71.06 | 68.47 | 66.31 |
| H | 0.78 | 0.53 | 0.5 |
| N | 0.65 | 0.65 | 0.65 |
| S | 0.65 | 0.67 | 0.83 |
| O | 4.04 | 2.55 | 1.09 |
| Total | 100 | 100 | 100 |

Catalytic Effect of Coal Pyrolysis

Figure 2:
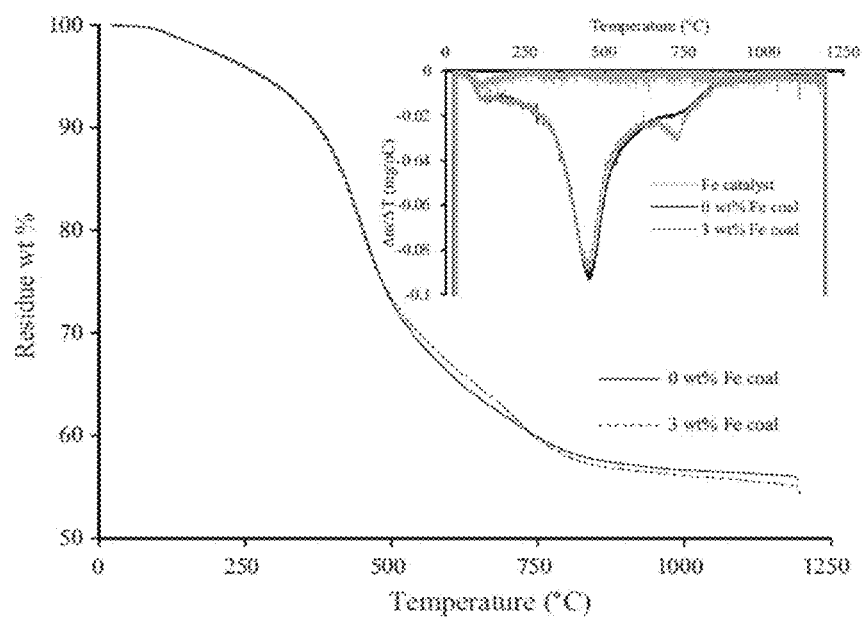
FIG. 2 illustrates thermogravimetric analysis (TGA) data for coal samples untreated and treated with $FeCO_3$ according to one embodiment described herein.

FIG. 2 illustrates a raw coal sample and a 3 wt % Fe-coal sample pyrolyzed using TGA. The mass of the coal samples analyzed was approximately 50 mg and the TGA operation conditions included a temperature ramping rate of 20° C./minute, Ar carrier gas environment at a flow rate of 100 ml/minute, and a maximum pyrolysis temperature of 1200° C. The weight percentage of the char generated at a given temperature was calculated using the weight of the residual material (char) in the sample pan of the TGA at the temperature relative to the initial weight of the coal sample. FIG. 2 illustrates that during pyrolysis, the weight loss of the treated coal generally follows the same curve as the untreated coal does. The temperatures at which maximum rate of mass loss occurs, corresponding to light gas and coal tar releases as shown in the inset of FIG. 2, is lowered from 443° C. for the raw coal to 433° C. for the 3 wt % Fe-coal. Another smaller maximum mass loss rate is centered at 719° C., which can be attributed to the reduction of iron oxides to elemental iron. The differences between 3 wt % Fe-coal and raw coal become evident above about 500° C., with slightly more mass loss for the treated coal above about 750° C. compared to the raw coal. Thus, it is believed that the iron is active not only during gasification but also during pyrolysis.

XRD

Figure 3:
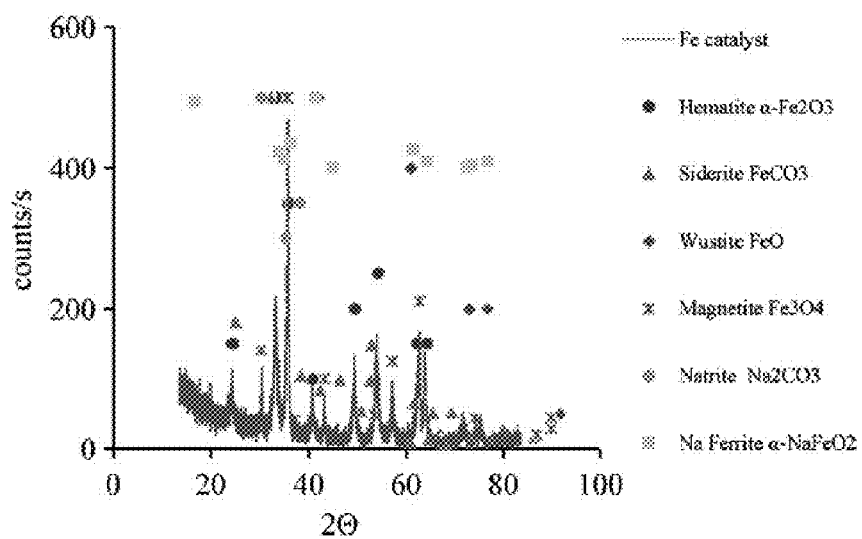
FIG. 3 illustrates X-ray diffraction (XRD) spectra of $FeCO_3$ according to one embodiment described herein.

FIG. 3 illustrates the XRD spectrum of the $FeCO_3$ calcined at 250° C. The strong characteristic peaks for hematite ($Fe_2O_3$) occur at 33.2°, 35.6°, 49.5°, 54.2°, 62.3°, and 64.2°, while the smaller peaks, e.g., at 31.2°, are those of siderite ($FeCO_3$) and the products of its decomposition during its thermal treatment, including wustite ((FeO), e.g. at 42°, 61°, 36.2°), and magnetite ($Fe_3O_4$), e.g., at 62.6°). It is believed that there may be some small quantities of sodium ferrite ($NaFeO_2$) with a small peak at 16.7°, however, that determination is not definitive because other stronger characteristic peaks associated with other minerals also appear in that region.

Figure 4:
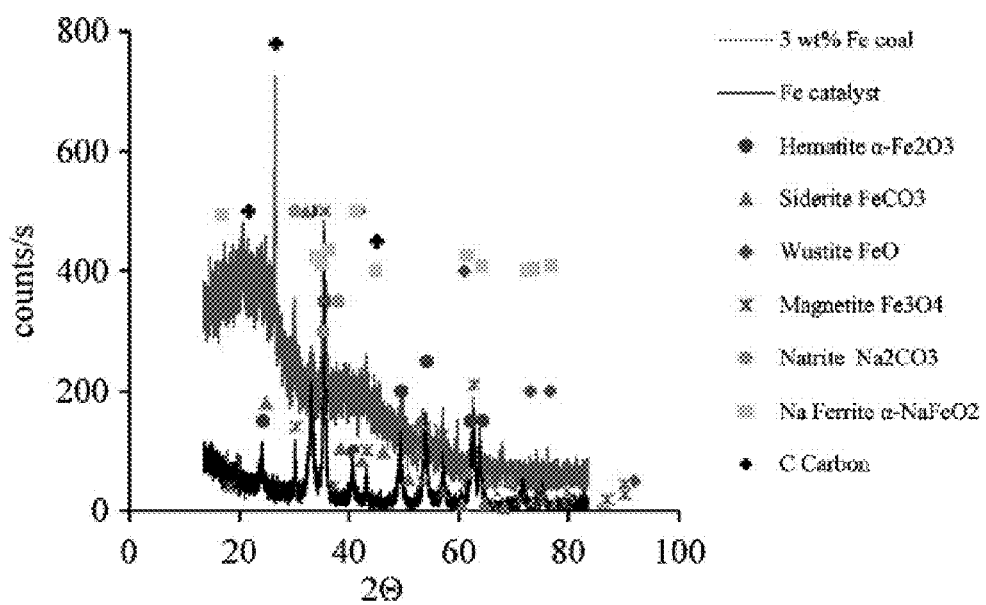
FIG. 4 illustrates XRD spectra of raw coal mixed with $FeCO_3$ according to one embodiment described herein.

FIG. 4 illustrates XRD spectra of the iron catalyst mixed with raw coal. The upper spectrum in FIG. 4 is the XRD of the raw coal mixed with the iron catalyst and the lower spectra is the XRD for the catalyst, which is duplicated from FIG. 3 for comparison to emphasize the peaks characteristic to the catalyst relative to the peaks specific to the coal's organic material and the coal's accompanying minerals. In addition to the peaks identified in FIG. 3, the wide peaks at approximately 21.5°, 26.5°, and approximately 45.5° are characteristic of carbon compounds (e.g. graphite) in coal, while other large peaks are assigned to clay compound and various carbonates.

Figure 5:
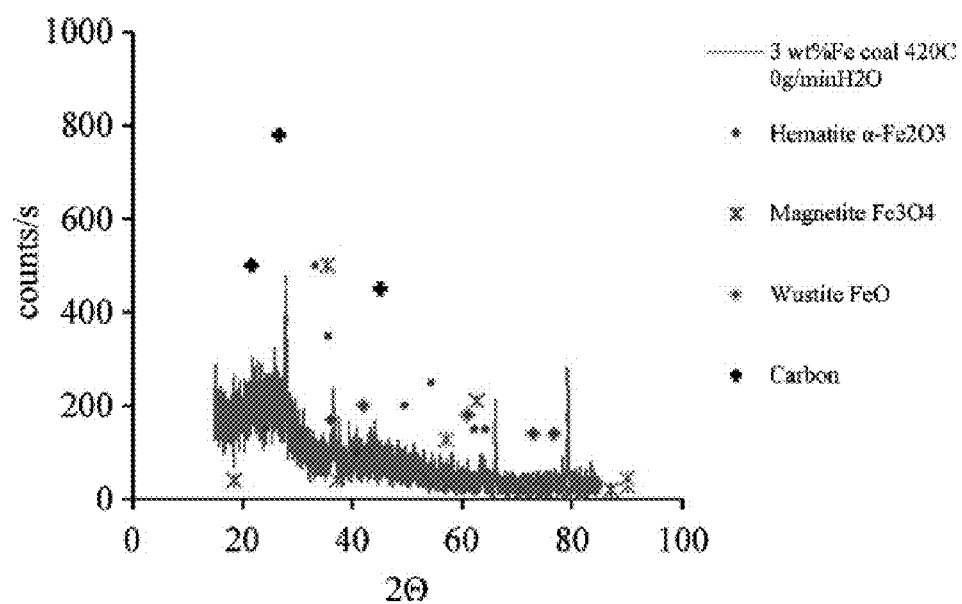
FIG. 5 illustrates XRD spectra of $FeCO_3$ and coal after pyrolysis at 420° C. according to one embodiment described herein.

FIG. 5 illustrates XRD spectra of the iron catalyst and coal after pyrolysis from ambient temperature (approximately 25° C.) to 420° C. at a ramping rate of 20° C./minute of a 5 g sample of DAF coal with an $N_2$ flow rate of 4.1 ml. minute. The presence of strong peaks for magnetite ($Fe_3O_4$) at 35.5° and 62.6° indicates that the initial iron compounds were transformed into magnetite in the reaction environment. Further, the disappearance of the twin peaks of hematite ($Fe_2O_3$) at 62.3° and 45.5° become sharper, indicating the onset of graphitization of the pyrolyzed coal. Also visible are other large peaks which may be assigned to clay compound and several other carbonate species.

Figure 6:
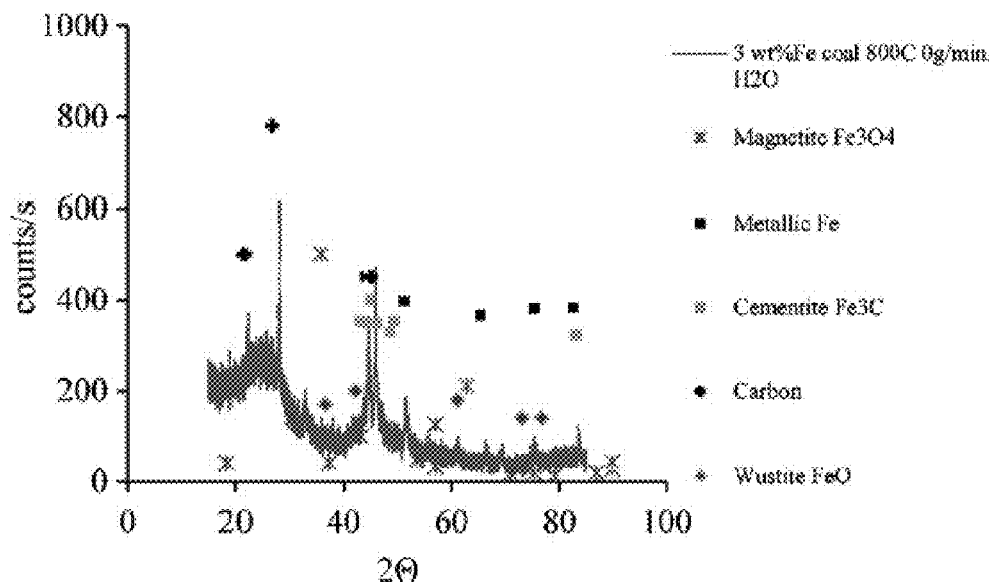
FIG. 6 illustrates XRD spectra of $FeCO_3$ and coal after pyrolysis at 800° C. according to one embodiment described herein.

FIG. 6 illustrates XRD spectra of the iron catalyst and coal after pyrolysis from ambient temperature (approximately 25° C.) to 800° C. at a ramping rate of 20° C./minute of a 5 g sample of DAF coal with an $N_2$ flow rate of 4.1 ml. minute. When compared the XRD spectra in FIGS. 4 and 5, the peaks at 26.5° and 45.5° are more pronounced, indicating that the graphitization degree of the pyrolyzed coal has increased. The FIG. 6 spectra suggests the formation of cementite ($Fe_3C$), characterized by a group of peaks centered at 45° and a more pronounced peak at 83.1°, which are mixed with the characteristic peaks of carbon and metallic Fe, with peaks at 43.9°, 51.2°, and 75.3°.

Figure 7:
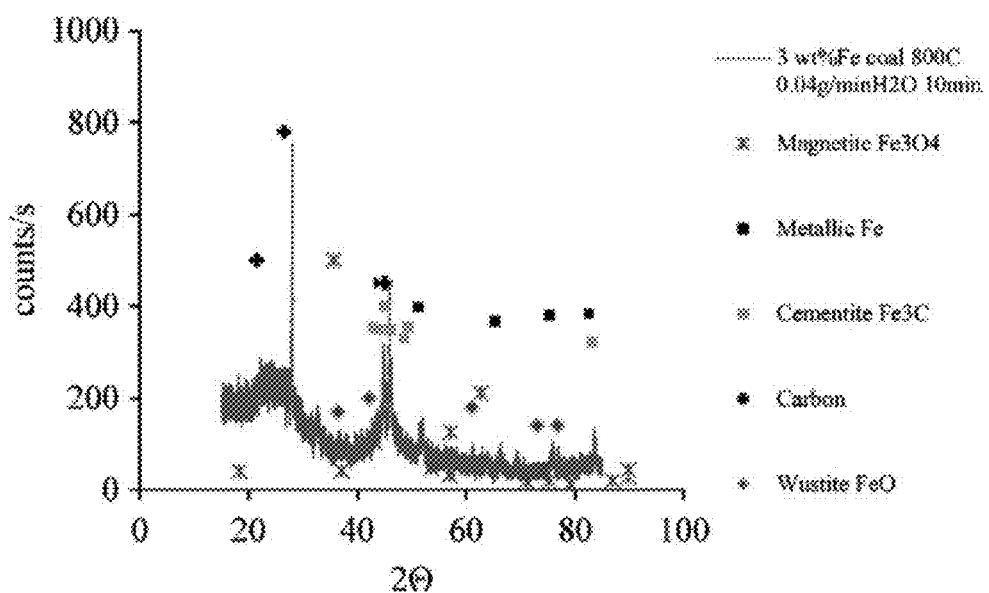
FIG. 7 illustrates XRD spectra of $FeCO_3$ and coal after pyrolysis and ten minutes of gasification according to one embodiment described herein.
Figure 8:
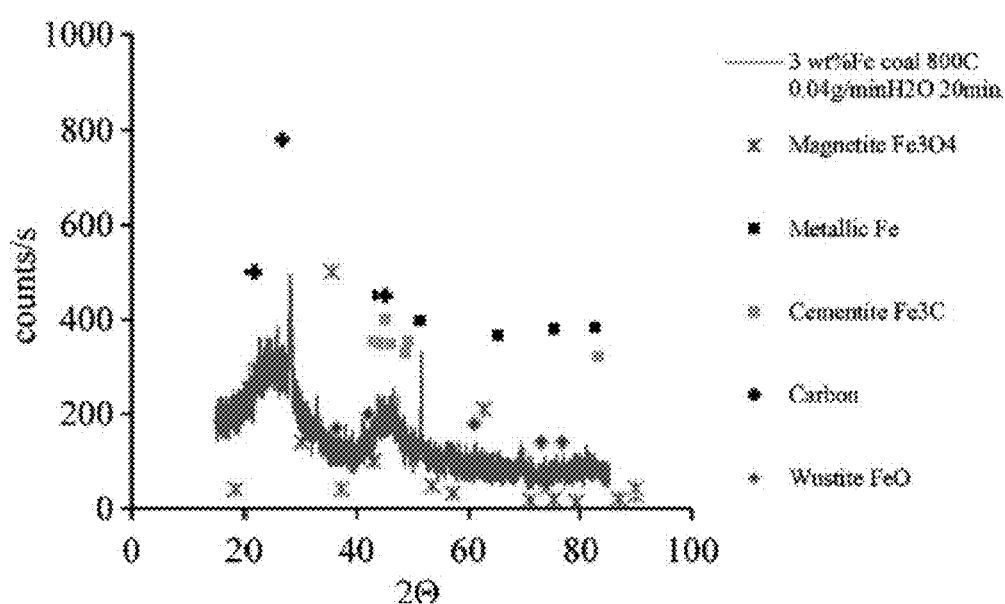
FIG. 8 illustrates XRD spectra of the $FeCO_3$ and coal after pyrolysis and twenty minutes of gasification according to one embodiment described herein.

FIGS. 7 and 8 illustrate XRD spectra of the 3 wt % Fe coal after pyrolysis of a 5 g mass of DAF coal contacted with steam at 0.04 g/min in an $N_2$ environment with a flow rate of 4.1 ml/minute at a temperature of 800° C. FIG. 7 illustrates 10 minutes of gasification under the aforementioned conditions. After 10 minutes of steam introduction, the intensity of the peak characteristic of FeO (wustite) increases, along with the peaks of metallic iron, while the peaks characteristic of $Fe_3C$ begin to decrease in intensity, which indicates that at least part of the $Fe_3C$ was transformed to iron and it is believed that some of the finely dispersed metallic iron was reoxidized to iron oxides.

The trends illustrated in FIG. 7 are more pronounced in FIG. 8 which illustrates 20 minutes of gasification under the aforementioned conditions. The cementite peaks nearly dissipate (e.g. 83.1°), while metallic iron peaks remain (e.g. 75.3° and 82.6°) and peaks associated with iron oxides, especially wustite (61°, 72.9°, and 76.6°), are present.

Mössbauer Spectroscopy

Figures 9A, 9B, 9C:
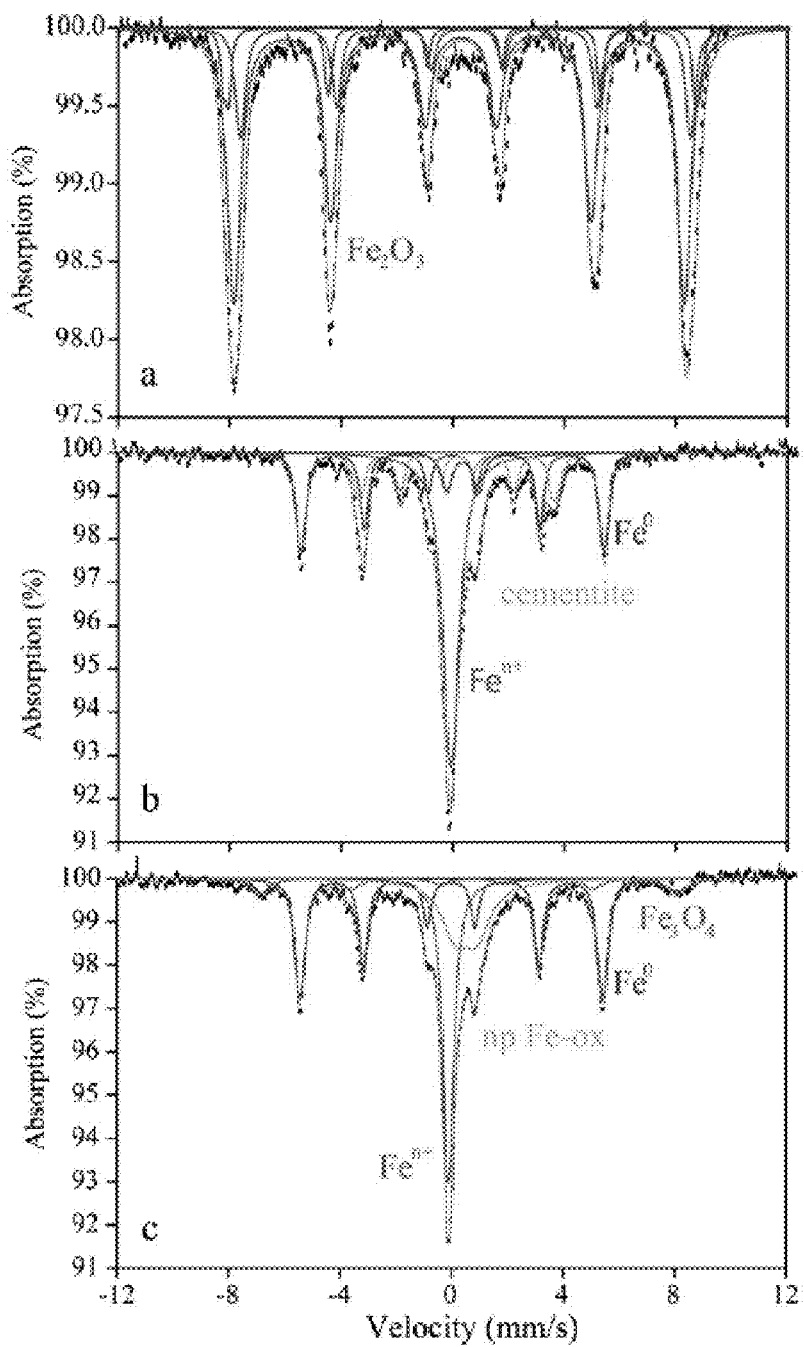
FIG. 9A illustrates Mossbauer spectra at 295 K of $FeCO_3$ and coal before pyrolysis according to one embodiment described herein.
FIG. 9B illustrates Mossbauer spectra at 295 K of $FeCO_3$ and coal after pyrolysis according to one embodiment described herein.
FIG. 9C illustrates Mössbauer spectra at 295 K of $FeCO_3$ and coal after pyrolysis and ten minutes of gasification according to one embodiment described herein.

FIG. 9A illustrates Mössbauer spectra at 295 K of the iron catalyst and coal before pyrolysis. As illustrated, all of the iron in the catalyst is Fe+ in the form of hematite ($Fe_2O_3$). No other Fe-bearing phases were observed.

FIG. 9B illustrates Mössbauer spectra at 295 K of the iron catalyst and coal after pyrolysis. As illustrated, a large doublet (43% of the total area at 295 K) that is associated with higher oxidation state iron, e.g. $FeO_4$ groups, with a strong signature of metallic Fe accounting for approximately 32% of the total Fe and small peaks that are believed to represent $Fe_3C$. A small doublet representing 7% of the total Fe has parameters believed to be consistent with six-coordinated $Fe^{3+}$.

FIG. 9C illustrates Mössbauer spectra at 295 K of the iron catalyst and coal after pyrolysis and 10 minutes of gasification. The higher oxidation state iron, accounting for 28% of total iron, is reduced to a ferric nanophase oxide representing 24% of the total Fe. Sextets associated with FeOOH and metallic iron, accounting for 9% and 40% of total iron, respectively, are also observed. It is believed that there is no evidence for cementite in the spectra of the gasified samples. Accordingly, the Mössbauer spectra results are generally consistent with the mineralogy observed with XRD.

FTIR of the Coal Tar

Figure 10:
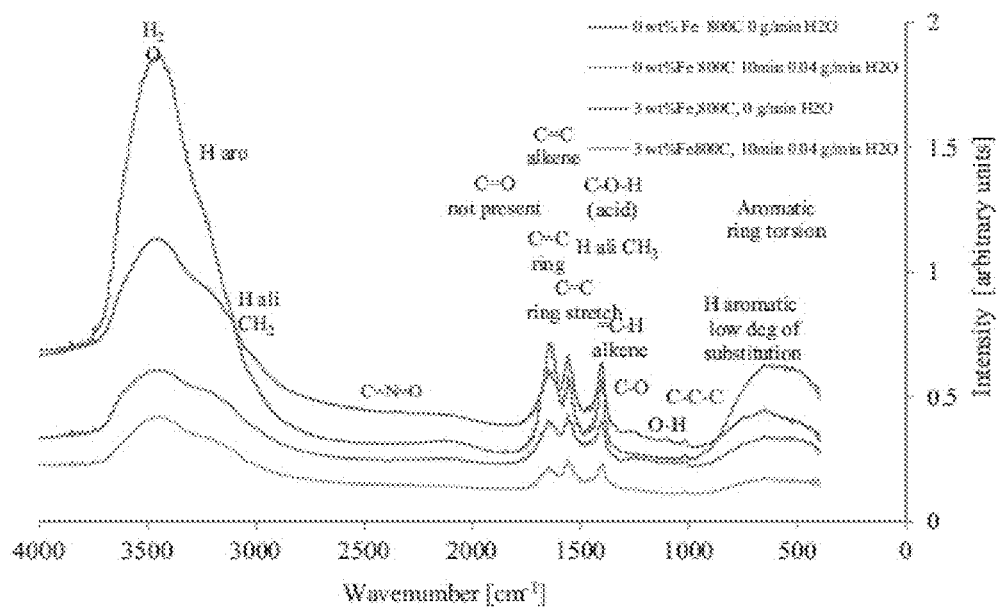
FIG. 10 illustrates Fourier transform infrared spectroscopy (FTIR) analysis of coal tar collected during pyrolysis and ten minutes of gasification for untreated and treated coal according to one embodiment described herein.

FIG. 10 illustrates FTIR analysis of the coal tar collected during pyrolysis (max. temp: 800° C.) and 10 minutes of gasification (mass of DAF coal: 5 g; $H_2O$: 0.04 g/min; $N_2$ flow rate: 4.1 ml/min; Temp.: 800° C.) for the uncatalyzed coal samples and 3 wt % Fe catalyzed coal samples. The coal tar condensed in the collection system by the water-cooling unit 15 (See FIG. 1) and was then retrieved for analysis. The large peak at approximately 3450 cm$^{-1}$ (characteristic of water) has two shoulders, one at approximately 3150 cm$^{-1}$ characteristic to H present in substituted aromatic rings and a smaller peak at approximately 2950 cm$^{-1}$ characteristic of H in CH$_2$ structures (aliphatic hydrocarbons or branches). The ratio of these two peaks is H$_{aro}$/H$_{ali}$>1, which suggests the aromatic character of the coal tar collected. The presence of the two peaks at approximately 1630 and 1550 cm$^{-1}$ (C=C aromatic ring stretching vibrations), shifted due to various degrees of ring substitution, while the aromatic H out of plane bend at low degrees of substitution. Aromatic ring torsions also display a wide band with many overlaps over 500-900 cm$^{-1}$.

The presence of aliphatic groups is indicated by the small peak characteristic for C—C—C bending at approximately 1010 cm$^{-1}$, the peak at approximately 2950 cm$^{-1}$ (H in aliphatic CH$_2$ structures mentioned previously), and by the peak at 1400 cm$^{-1}$ characteristic of H in aliphatic CH$_3$ structures and also for CH$_2$ and CH$_3$ deformations and O—O—H in-plane bending. All four spectra are similar. However, there are some important differences for the bottom two spectra in FIG. 10, which are of the tar collected from the 3 wt % Fe catalyzed coal samples. Compared to the spectra for the samples without the catalyst, several peaks are absent, including the small peaks at 1250 cm$^{-1}$ (assigned to C—O bond stretching), the peak at 1100 cm$^{-1}$ (assigned to organic O H stretching), and the double peaks at 2366 and 2328 cm$^{-1}$, which could be the products of various physical phenomena (e.g., overtones), but can be assigned to the CO$_2$ asymmetric stretch.

The 1630 and 1550 cm$^{-1}$ peaks for the coal tar produced from pyrolysis only (without gasification) in the presence of the iron catalyst have a peak height ratio larger than one (i.e., the 1630 cm$^{-1}$ peak is larger), while all the other samples displayed a ratio smaller than one (i.e., the 1550 cm$^{-1}$ peak is larger). The implication of the declining ratio is discussed below. The peak of C—O stretching (from ketones, aldehydes or carboxylic acids), expected in the interval 1690-1780 cm$^{-1}$ is absent, although it might be shifted.

Pyrolysis

The iron catalyst at the beginning of the pyrolysis process, as shown by the XRD (See FIG. 3) and Mössbauer spectroscopy (See FIG. 9(a) is comprised mostly of hematite (Fe2O3), siderite (FeCO3), various oxides, and possibly ferrites. After mixing with coal and drying, the catalyst particles are in close contact with coal particles. When coal was heated in the absence of oxygen, the pyrolysis process produces variable quantities of H$_2$, CH$_4$, CO, and CO$_2$, together with complex mixtures of organic substances (coal tar), in the vapor phase in the presence of the solid coal residue (char). Thus, the reaction environment is reducing in nature, which causes the decomposition of the traces of iron carbonate to iron oxides and the reduction of iron oxides to iron and iron carbide above 719° C., as shown by the TGA, XRD, and Mössbauer analyses. The reducing environment was previously discussed with the TGA data, in which the decrease in the maximum mass loss rate by 10° C. from 443° C. for the raw coal to 433° C. for the catalyzed coal can be explained by the transformation of various iron oxides to magnetite, as evidenced by the XRD analysis (See FIG. 5).

The cut temperature for the reactor outlet gases collected as liquid coal tar was set by the water-cooled condenser (See FIG. 1 item 15) at approximately 25° C. The addition of the iron catalyst to the coal caused the dynamic pressure drop in the tubing to decrease due to less tar condensation and also resulted in a smaller quantity of tar collected at the end of the test, which suggests that the tar was more volatile. TGA analysis shows a relatively small influence of the catalyst during pyrolysis. FTIR analysis shows a very similar spectra of high aromatic character, as previously described above. However, the addition of the iron catalyst produced tar without IR peaks at 1250 cm$^{-1}$ resulting from C—O bonds stretching and 1100 cm$^{-1}$ due to the stretching of organic O—H. The absence of those peaks suggests dehydroxylation of the molecules present in the coal tar under the influence of iron catalyst.

It is believed that at least two mechanisms exist to describe the reaction. The first reaction is based on a redox mechanism, where the carbon bearing the OH bond is oxidized on the iron catalyst and transformed to aldehydes/ketones. A possible reaction that generates aldehydes is:

$$R\text{—}C^{1+}H_2\text{—}OH+Fe^{3+}(O) \rightarrow R\text{—}HC^{2+}\!\!=\!\!O+H_2O+Fe^{2+} \quad (R1)$$

The reaction, resulting from the redox ability of magnetite, is predicted by various oxygen transfer models on iron catalysts during interaction with coal at high temperature. Therefore, in the collected coal tar, it was expected to find a peak generated by C=O stretching (from ketones, aldehydes, or carboxylic acids) in the interval 1690-1780 cm$^{-1}$. However, unless the peak is radically shifted to approximately 1630 cm$^{-1}$, which is unlikely, the expected peak was not detected.

The second mechanism is the dehydration of the coal tar with concomitant production of double bonds (alkenes) or:

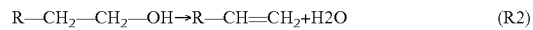

$$R\text{—}CH_2\text{—}CH_2\text{—}OH \rightarrow R\text{—}CH\!\!=\!\!CH_2+H2O \quad (R2)$$

The reaction (R2) is generic. The OH groups may also be present on secondary or tertiary carbons. In this example, the reaction would likely produce a number of C=C structures, detectable by their characteristic peaks, but would also increase volatility of the coal tar by decreasing the number of hydrogen bonds present. The peak at 1630 cm$^{-1}$ is typically associated with C=C stretching either in ring (aromatic) structures or in alkenes (aliphatic) structures. In examples when the coal tar is collected after the pyrolysis in the presence of the iron catalyst, the peak at 1630 cm$^{-1}$ is larger than the peak at approximately 550 cm$^{-1}$ due to the C=C ring stretch. Alternatively, in the tar sample collected after 10 min of gasification, the peak becomes smaller, suggesting the evaporation of the substances generating a larger peak at 1630 cm$^{-1}$. The observation indicates a water gas shift (WGS) reaction associated mechanism, which is a mediated oxygen transfer from water to CO via adsorbed OH groups. The reaction is catalyzed by magnetite, where CO and H$_2$ are present, together with CO$_2$. This type of dehydration forming C=C bonds in organic molecules is surprising for magnetite and is more commonly associated with acidic catalysts. The dehydration reaction type also occurs on magnesium substituted alumina (Mg$_y$AlO$_x$) and alumina phosphates loaded with transition metals.

Catalytic Effect of FeCO3 on Gasification Kinetics

The kinetics of coal gasification was evaluated in a temperature range of 700-900° C. with the shrinking core model:

$$dX/dt = k_{SC}(1-X)^{2/3}$$

where X represents carbon conversion fraction, t is the time, and k$_{SC}$ is the specific carbon conversion rate constant.

Figure 11:
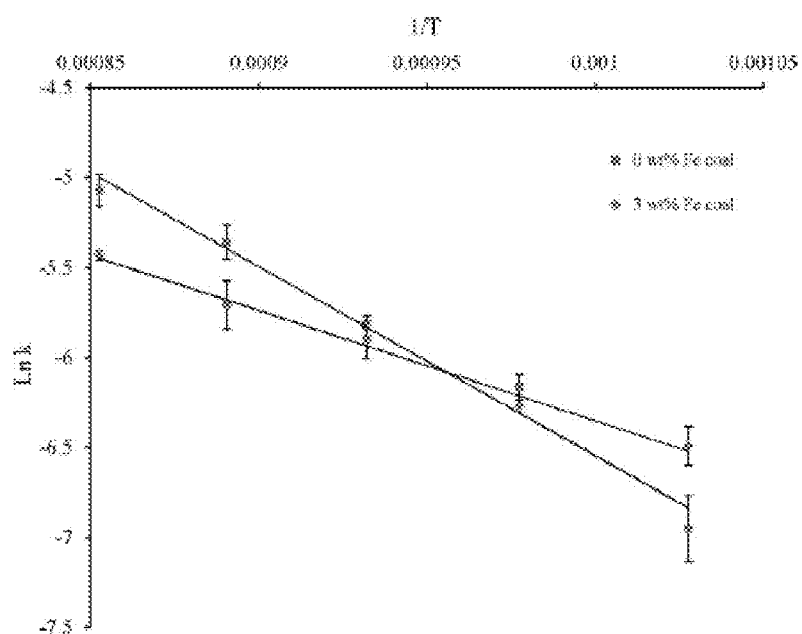
FIG. 11 illustrates an Arrhenius plot depicting the effect of temperature on the gasification reaction rate constant according to one embodiment described herein.

FIG. 11 illustrates an Arrhenius plot showing the effect of temperature on the gasification reaction rate constant, k$_{SC}$ obtained with the shrinking core model for both the raw coal and the 3 wt % Fe coal. Using the shrinking model, the apparent activation energy results were 89.5 kJ/mol for the untreated coal, which decreased to 50.6 kJ/mol for the coal containing 3 wt % Fe. For comparison, conventional activation energy for similar raw coal based on the random pore model is 102.3 kJ/mol.

Catalytic Gasification Mechanism

Figure 12A:
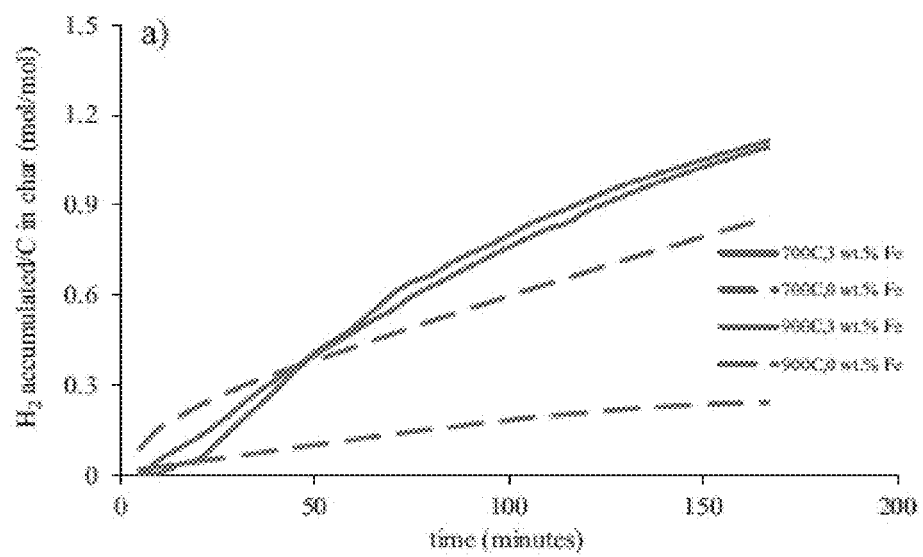
FIG. 12A illustrates $H_2$ gas generated per carbon in char for coal samples untreated and treated with $FeCO_3$ according to one embodiment described herein.
Figure 12B:
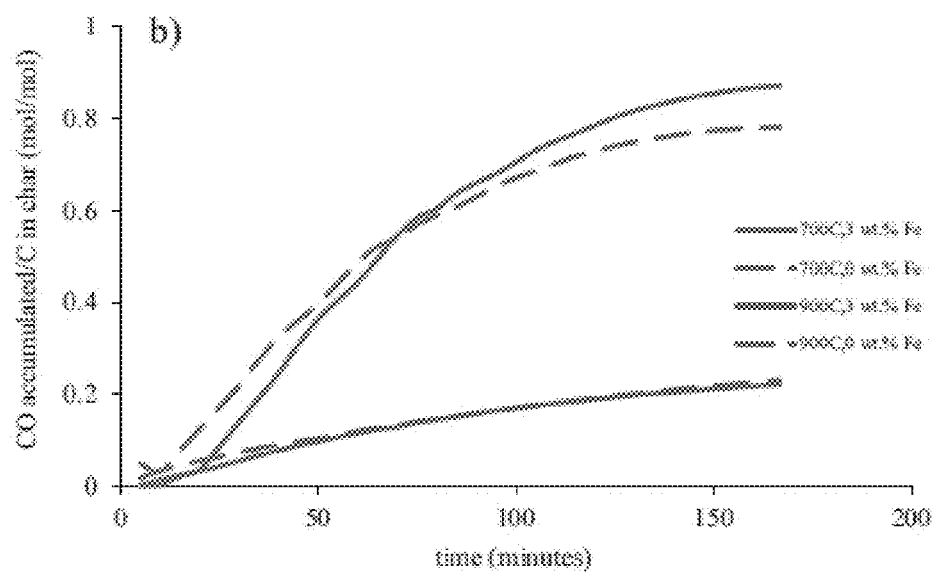
FIG. 12B illustrates CO gas generated per carbon for coal samples untreated and treated with $FeCO_3$ according to one embodiment described herein.

FIGS. 12A and 12B illustrate data comparing the $H_2$ and CO generated normalized per carbon in the char for coal samples untreated (dashed lines) and with 3 wt % Fe addition (solid lines) at 700° C. and 900° C. during the first 200 min of the embodiments described herein. As the reactor reaches the reaction temperature, there is an induction period of from about 10 to about 25 minutes before the catalytic reactions begin, which can be associated with phase transformation in catalytic material shown by XRD and Mössbauer analyses discussed earlier. The time required for the phase transformation is decreased as the temperature increases. FIGS. 12A and 12B also contain points around 770° C. which corresponds to approximately equal values of the reaction rate constant for the catalyzed and uncatalyzed systems.

The effect of the iron catalyst on $H_2$ production at both 700° C. and 900° C. (FIG. 12A) is evident after the induction period. In the 200-minute gasification period, 0.95 and 1.20 mol of $H_2$ were generated at 700° C. with 1 mol uncatalyzed and catalyzed carbons in char, respectively. At 900° C., the difference becomes more pronounced because the quantity of $H_2$ generated with catalyzed char is about 300% higher than that with uncatalyzed char. The quantities of CO generated at 700° C. with catalyzed and uncatalyzed chars within the same gasification period are similar while about 12% more CO was produced with catalyzed char than uncatalyzed char at 900° C., as demonstrated in FIG. 12B. The amounts of $CO_2$ resulting from 200-minute gasification of catalyzed coal chars at 700° C. and 900° C. are 13% and 25% higher, respectively.

The accepted reaction model states that metallic iron, after reacting with steam, generates hydrogen and a layer of iron oxide on the surface of the particle. The oxide layer reacts with nearby carbon which may reduce iron oxide to metallic iron and generate carbon monoxide (R4), followed by the desorption of the carbon monoxide, as summarized in the following reactions:

$$Fe+H_2O \rightarrow Fe(O)+H_2 \quad (R3)$$

$$Fe(O)+C \rightarrow C(O)+Fe \quad (R4)$$

$$C(O) \rightarrow CO \quad (R5)$$

$$C+H_2O \rightarrow CO+H_2 \quad (R6)$$

The model presumes the iron species present in the catalyst is $Fe^0$ and that the reaction takes place only if carbon is present in proximity of the metallic iron particle. The quantity of $H_2$ generated during the catalytic cycle is equal to the quantity of $H_2$ generated in an uncatalyzed cycle, as shown in the overall reaction (R6). As a result of the low mobility of iron, the rate of reaction may decrease if the interface between the catalytic particle and coal particles becomes depleted of carbon. The theoretical model with short distance interaction is consistent with the experimental observations and may mathematically be explained using shrinking core reaction model, which presumes that as the reaction progresses, the reactants and products pass through a layer of ash, with the reaction taking place at the shrinking core surface of unreacted material.

Another mechanism that may generate $H_2$ is the WGS reaction (R10) on FeO (wustite) with surface defects, with the $CO_2$ produced being consumed by the Bouduard reaction (R9). The net result of these reactions remains the overall gasification reaction (R6):

$$3FeO+H_2O \rightarrow Fe_3O_4+H_2 \quad (R7)$$

$$Fe_3O_4+CO \rightarrow 3FeO+CO_2 \quad (R8)$$

$$CO_2+C \leftrightarrow 2CO \quad (R9)$$

$$C+H_2O \rightarrow CO+H_2$$

The sum of (R7) and (R8) is the WGS reaction (R10):

$$H_2O+CO \leftrightarrow H_2+CO_2 \quad (R10)$$

In this example, the reaction may not require the presence of carbon in the immediate vicinity of the catalyst because the $CO_2$ formed can easily transport through the gas phase to react at longer distances with the carbon in coal. The result of this reaction model is that the quantities of $CO_2$ and $H_2$ produced with iron catalyzed coal is larger compared with the uncatalyzed coal due to the water-gas-shift reaction. The uncatalyzed and slower Bouduard reaction determines the overall reaction rate (and thus the CO quantity will be similar or lower to that of uncatalyzed gasification), while the catalyzed and faster WGS reaction will produce more $H_2$ and $CO_2$.

Table 4 illustrates the quantities of gasification products generated at various temperatures during coal gasification normalized for the quantities of carbon present in the char at the end of pyrolysis for untreated samples and samples treated with $FeCO_3$ (3 wt % Fe). The data provided in Table 4 was generated based upon the following conditions: mass of DAF coal: 5 g; $H_2O$: 0.04 g/min; $N_2$ flow rate: 4.1 ml/min; gasification temp.: 700-900° C.

TABLE 4

| Fe (wt %) | Temp. (° C.) | $H_2$ from $H_2O$ produced (mol/mol C) | $CH_4$ produced (mol(>$10^{-2}$)/mol C) | CO produced (mol(>$10^{-1}$)/mol C) | $CO_2$ produced (mol(>$10^{-1}$)/mol C) |
|---|---|---|---|---|---|
| 0 | 700 | 1.558 | 3.739 | 3.285 | 6.424 |
| 0 | 750 | 1.386 | 3.086 | 5.040 | 4.651 |
| 0 | 800 | 1.336 | 2.830 | 6.410 | 3.305 |
| 0 | 850 | 1.182 | 2.286 | 7.308 | 2.024 |
| 0 | 900 | 1.119 | 1.720 | 8.746 | 1.081 |
| 3 | 700 | 1.523 | 3.813 | 3.007 | 6.584 |
| 3 | 750 | 1.464 | 3.307 | 4.702 | 4.967 |
| 3 | 800 | 1.315 | 2.776 | 6.145 | 3.577 |
| 3 | 850 | 1.191 | 2.287 | 7.536 | 2.230 |
| 3 | 900 | 1.117 | 1.328 | 8.73 | 1.120 |

Figure 13:
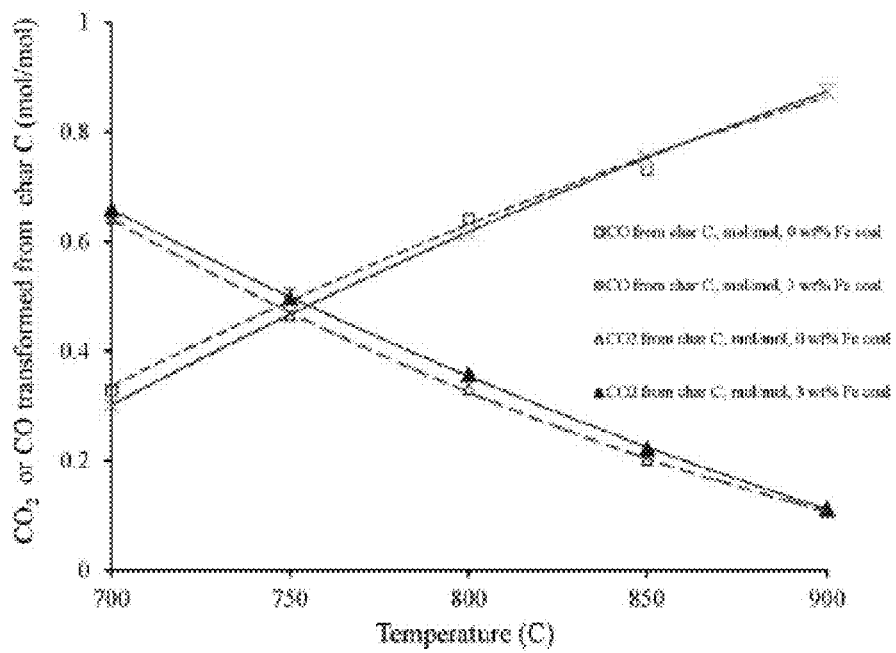
FIG. 13 illustrates a molar fraction data of char carbon transformed into CO and $CO_2$ at different temperatures during coal gasification for samples untreated and treated with $FeCO_3$ according to one embodiment described herein.
Figure 14:
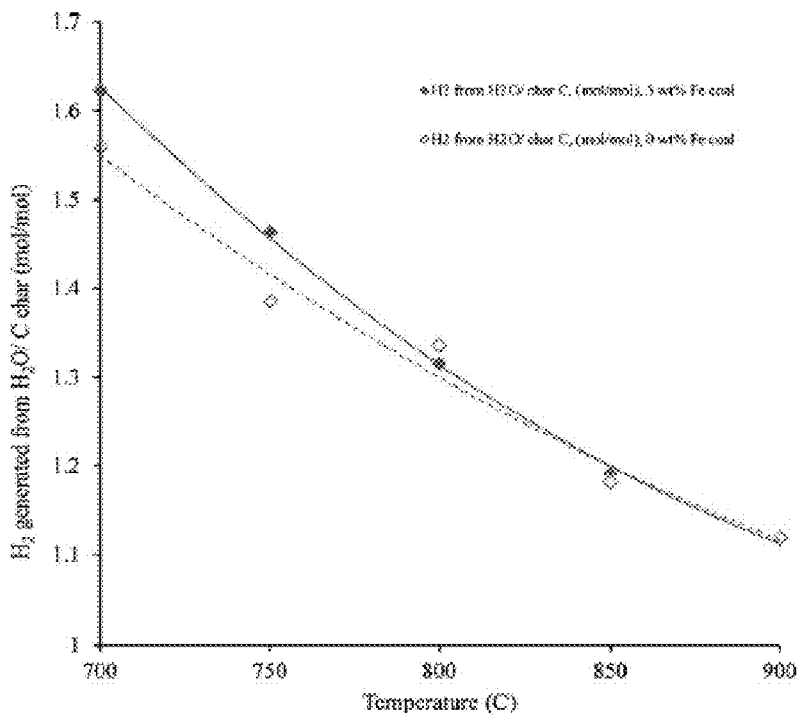
FIG. 14 illustrates data comparing moles of $H_2$ produced from steam for one mole of char carbon during coal gasification for samples untreated and treated with $FeCO_3$ according to one embodiment described herein.

FIGS. 13 and 14 illustrate and compare the quantities normalized per char carbon of $CH_4$, CO and $CO_2$, and $H_2$ generated by reaction with $H_2O$ during gasification of coal under the same conditions specified in Table 4 for the uncatalyzed reaction and iron catalyzed samples. Comparing the quantities of CO and $CO_2$ produced during gasification in the catalyzed and uncatalyzed examples, the quantities produced appear to be the result of the opposing trends with temperature for the equilibrium constants for the WGS and Bouduard reactions. The equilibrium constant for the exothermic WGS reaction decreases with increasing temperature, while the equilibrium constant for the endothermic Bouduard reaction increases.

The comparison between the quantities of CO and $CO_2$ generated, normalized for the quantities of carbon present in the char at the end of pyrolysis as function of temperature (FIG. 13 and Table 4), indicate that the presence of the iron catalyst generates slightly higher $CO_2$ and less CO compared with the uncatalyzed example which suggests activity of iron oxides in the WGS reaction.

The quantities of $H_2$ normalized on the carbon present in char generated by reaction with $H_2O$ during gasification for the iron catalyzed reaction are larger (Table 4 and FIG. 14) at lower temperatures and become similar at higher temperatures compared to the uncatalyzed reaction. The increased $H_2$ quantity at lower temperature is believed to be a result of the water-gas-shift reaction (R10), which suggests a $FeO$—$Fe_3O_4$ couple was present within the reaction environment in smaller quantities as the temperature of the exemplary reactions was increased. The values of $H_2$ generated by reaction with $H_2O$ normalized on the carbon present in char were calculated by subtracting from the values of $H_2$ produced during gasification the quantities of hydrogen left in the char structure after pyrolysis (See Table 3) and normalizing the result on the carbon present in char. As illustrated in iron catalyzed example of FIG. 14, larger quantities of $H_2$ were generated per carbon from char for temperatures below about 850° C., indicating the presence of iron oxides in the catalytic mass. With reaction temperatures above about 850° C., the $H_2$ quantity becomes similar to the uncatalyzed reaction, which suggests a catalytic mechanism driven by metallic iron.

The FTIR and XRD analyses of the tar mentioned in the aforementioned sections suggests the participation of magnetite ($Fe_3O_4$) in coal pyrolysis. The data in FIGS. 7, 8 and 9A-9C suggest that metallic iron, iron carbide, and FeO—$Fe_3O_4$ are present during gasification and are catalysts for hydrogen generation. Thus, the wustite-magnetite couple appears also to be the active species during the gasification operation, but metallic iron was present during the fast gasification period. For the pyrolysis operation and volatilization of the tar, the phase equilibrium diagram for the temperatures utilized as depicted in FIG. 15 indicates the stability of magnetite during the temperature interval of the maximum pyrolysis rate, which is confirmed by XRD spectra presented in FIG. 5.

The reduction of iron oxide occurs as a function of the temperature and concentration of CO, while the CO concentration in systems containing char is governed by the Bouduard reaction (R9). According to the phase equilibrium diagram for the Fe—O—C system with the Bouduard equilibrium curve plotted in FIG. 15, the reduction of iron oxides follows the concentration of CO at different temperatures. For example, at 433° C., the maximum temperature for the devolatilization rate during coal pyrolysis based on the TGA analysis, the Fe—O—C equilibrium diagram indicates that the stable iron phase is magnetite ($Fe_3O_4$), which is in accordance with the XRD results for the material collected after pyrolysis at 420° C. It is also believed that the dehydration reactions observed using FTIR may be attributed to magnetite.

Figure 15:
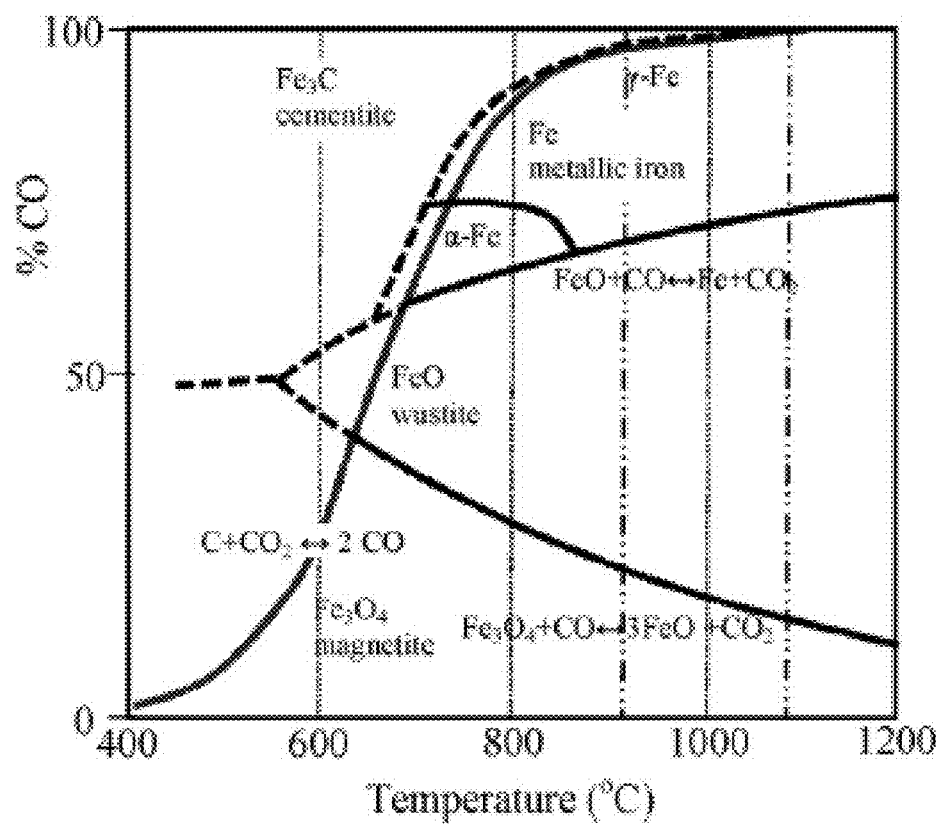
FIG. 15 illustrates a phase equilibrium diagram for a Fe—O—C system with a Bouduard equilibrium curve according to one embodiment described herein.

According to the curve for the Bouduard reaction illustrated in FIG. 15, metallic iron is generally in the stable phase a temperatures higher than about 700° C., such as higher than about 719° C. At temperatures greater than about 719° C., various phases of reduced iron are stable and the reduced iron phases are influenced by the interactions with other components and the oxidizing or reducing environment as indicated by the concentrations of steam, $H_2$, etc. The XRD and Mössbauer data indicated that at about 800° C. after the pyrolysis operation, the iron phases present are metallic iron and cementite ($Fe_3C$). After gasification was initiated by the introduction of steam, the cementite phase began to disappear while the metallic iron phase signal became larger, with several weak peaks attributed to iron oxides (wustite). The same analysis for different temperatures explains the increase in $H_2$ production as a result of increased oxide formation (e.g. magnetite), as superficial oxide may be formed on wustite (See (R7) and (R8)). The decreased reaction rate constant at higher temperatures, due to the increased formation of iron carbide ($Fe_3C$), is believed to be inert for gasification and WGS reactions.

In summation, the addition of iron carbonate as a catalyst is beneficial to the coal gasification process. Beneficial results include the increased coal conversion rate and tar mitigation via volitalization, as well as increased $H_2$ production at relatively low temperatures. Various iron species catalyze different portions of the coal gasification process resulting in a significant reduction in the activation energy associated with coal gasification.

While the foregoing is directed to embodiments of the present disclosure, other and further embodiments of the disclosure may be devised without departing from the basic scope thereof, and the scope thereof is determined by the claims that follow.

What is claimed is:

1. A coal gasification method, comprising:
   mixing a coal derived solid with an iron carbonate catalyst to form a reaction mixture, wherein the iron carbonate catalyst is present in the reaction mixture at a concentration of between 1 wt % and 5 wt %;
   disposing the reaction mixture in a gasifier;
   heating the reaction mixture to a target temperature between 700° C. and 900° C.;
   contacting the reaction mixture with water vapor;
   maintaining a pressure of the gasifier below 1 atm; and
   forming a syngas mixture from the reaction mixture.

2. The coal gasification method of claim 1, wherein the iron carbonate catalyst is an aqueous solution.

3. The coal gasification method of claim 2, further comprising:
   drying and heating the aqueous solution to form a calcined $FeCO_3$ catalyst.

4. The coal gasification method of claim 1, further comprising disposing the reaction mixture in a fixed bed gasifier.

5. The coal gasification method of claim 1, wherein the iron carbonate catalyst is present in the reaction mixture at a concentration of 3 wt %.

6. The coal gasification method of claim 5, further comprising contacting the reaction mixture with nitrogen.

7. The coal gasification method of claim 5, wherein the reaction mixture is maintained at the target temperature for a time between 100 minutes and 2,000 minutes.

8. The coal gasification method of claim 1, wherein the heating the reaction mixture is performed at a rate of 20° C./minute.

9. The coal gasification method of claim 1, wherein the syngas mixture comprises at least one of $H_2$, CO, and $CO_2$.

10. The method of claim 6, wherein the nitrogen consisting essentially of nitrogen is flowed into the gasifier.

11. A coal gasification method, comprising:
mixing a coal derived powder with a calcined iron carbonate catalyst to form a reaction mixture, wherein the calcined iron carbonate catalyst is present in the reaction mixture at a concentration of between 1 wt % and 5 wt %;
heating the reaction mixture to a target temperature between 700° C. and 900° C.;
contacting the reaction mixture with steam;
flowing the reaction mixture and the steam into a gasifier;
flowing nitrogen consisting essentially of nitrogen into the gasifier;
maintaining a pressure of the gasifier below 1 atm; and
forming a syngas mixture from the reaction mixture.

12. The coal gasification method of claim 11, wherein the gasifier is a fixed bed gasifier.

13. The coal gasification method of claim 11, further comprising:
maintaining the reaction mixture at the target temperature for a time between 100 minutes and 2,000 minutes.

14. The coal gasification method of claim 11, wherein the heating the reaction mixture is performed at a rate of 20° C./minute.

15. The coal gasification method of claim 11, wherein the syngas mixture comprises at least one of $H_2$, CO, and $CO_2$.

16. A method of forming syngas from coal, comprising:
mixing a powdered coal having a moisture content of at least 10 wt % with 3 wt % of a $FeCO_3$ catalyst to form a reaction mixture;
blending a stoichiometric excess of water vapor with the reaction mixture;
disposing the reaction mixture in a gasifier;
flowing nitrogen consisting essentially of nitrogen into the gasifier; and
maintaining a temperature of the reaction mixture between 700° C. and 900° C. until a syngas mixture is formed.

17. The method of claim 16, wherein the powdered coal and the $FeCO_3$ catalyst are dry mixed to form the reaction mixture.

18. The method of claim 16, wherein the gasifier is a fixed bed gasifier.

19. The method of claim 16, wherein the syngas mixture comprises at least one of $H_2$, CO, and $CO_2$.

20. The method of claim 16, further comprising:
maintaining a pressure of the gasifier between 0.75 atm and 1 atm.

* * * * *